(12) United States Patent
Hamano

(10) Patent No.: US 6,283,594 B1
(45) Date of Patent: Sep. 4, 2001

(54) GRIP DEVICE FOR EYEGLASSES

(76) Inventor: Miles M. Hamano, 1443 Ala Naupaka St., Honolulu, HI (US) 96818

( * ) Notice: Subject to any disclaimer, the term of this patent is extended or adjusted under 35 U.S.C. 154(b) by 0 days.

(21) Appl. No.: 09/478,346

(22) Filed: Jan. 6, 2000

(51) Int. Cl.[7] ................................................ G02C 3/00
(52) U.S. Cl. ........................... 351/155; 351/41; 351/130; 351/158
(58) Field of Search ........................ 351/41, 155, 156, 351/158, 124, 130, 131, 132, 133

(56) References Cited

U.S. PATENT DOCUMENTS

| | | | |
|---|---|---|---|
| 946,596 | 1/1910 | Cook | 351/41 |
| 2,066,735 | 1/1937 | Montgomery | 351/124 |
| 3,701,592 | 10/1972 | Fernandez | 351/130 |
| 3,758,202 | * 9/1973 | Chunga, Sr. | 351/41 |
| 4,304,470 | 12/1981 | Marly | 351/130 |
| 4,747,681 | 5/1988 | Brower | 351/139 |
| 4,781,451 | 11/1988 | McAllen | 351/156 |
| 4,885,808 | 12/1989 | Carpenter | 2/452 |
| 4,964,716 | 10/1990 | Combs | 351/139 |
| 5,719,655 | * 2/1998 | Peschel et al. | 351/111 |

* cited by examiner

Primary Examiner—Huy Mai
(74) Attorney, Agent, or Firm—Siemens Patent Services, LC

(57) ABSTRACT

A grip device to prevent eyeglasses having a bridge piece from slipping downwardly on the nose over time. The device comprises two mutually removable attachment components, one fixed to the rear surface of the bridge piece of the eyeglasses, and the other fixed to the bridge of the nose of a person. Each attachment component is preferably a flexible tape having exposed adhesive. The two attachment components mutually attach employing removable connector material. In alternative embodiments, this connector material is magnetic materials, or alternatively comprises hook and loop fastener. The two attachment components are small and inconspicuous. The attachment component which is adhered to the face is flesh colored.

17 Claims, 3 Drawing Sheets

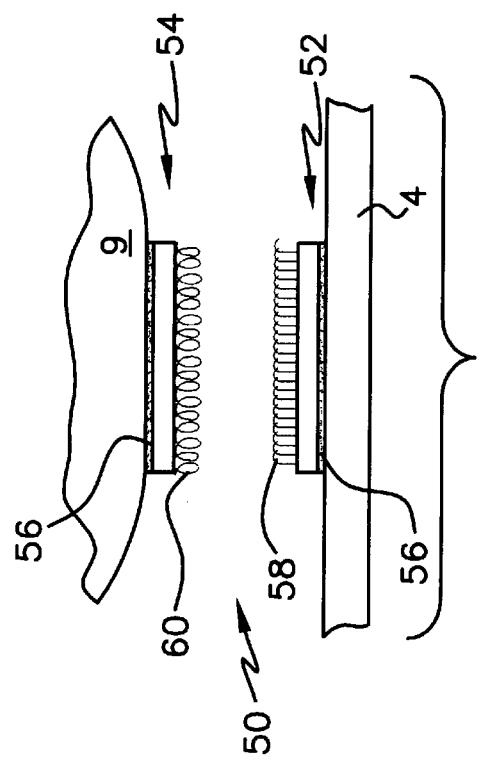
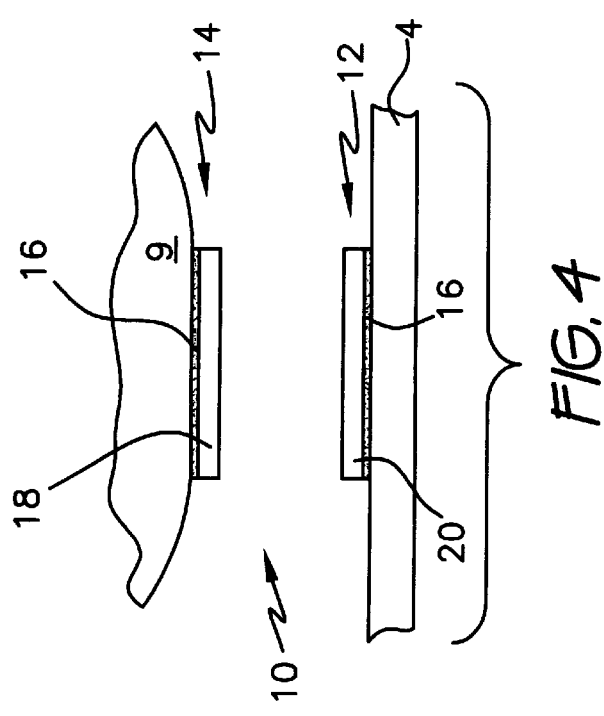
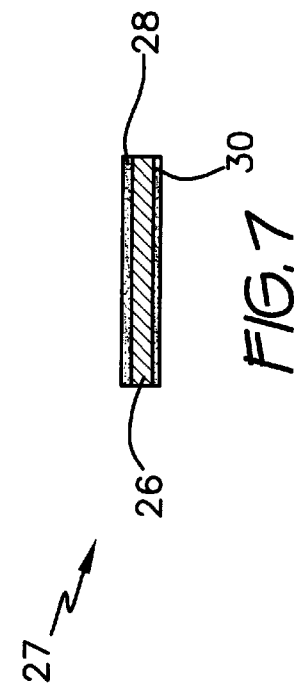

GRIP DEVICE FOR EYEGLASSES

REFERENCE TO RELATED APPLICATION

This application is related to Disclosure Document Number 452779 filed Mar. 11, 1999.

BACKGROUND OF THE INVENTION

1. Field of the Invention

The present invention relates generally to holders for eyeglasses. More particularly, the invention sets forth apparatus for retaining glasses in a desired position on the face and head of the wearer.

People who wear eyeglasses and are mildly active throughout their daily routine are the principal beneficiaries of the instant invention. However, many other users, such as people who wear spectacles, visors, goggles and the like, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Attempts have been made in the prior art to devise holders for eyeglasses that stabilize the eyeglasses in a stationary position when worn by a person. Holders for eyeglasses are shown in U.S. Pat. No. 946,596, issued to Cook on Jan. 18, 1910, U.S. Pat. No. 2,066,735, issued to Montgomery on Jan. 5, 1937, U.S. Pat. No. 3,701,592, issued to Fernandez on Oct. 31, 1972, U.S. Pat. No. 3,758,202, issued to Chunga, Sr. on Sept. 11, 1973, U.S. Pat. No. 4,304,470, issued to Marly on Dec. 8, 1981, U.S. Pat. No. 4,747,681, issued to Brower on May 31, 1988, U.S. Pat. No. 4,781,451, issued to McAllen on Nov. 1, 1988, U.S. Pat. No. 4,885,808, issued to Carpenter on Dec. 12, 1989 and U.S. Pat. No. 4,964,716, issued to Combs on Oct. 23, 1990.

U.S. Pat. No. 946,596, to Cook, discloses shooting glasses having an improved hinge by which the lenses are connected. Combined with the hinge is a nose piece of such a form that the lenses will be held in the proper position in front of the eyes.

U.S. Pat. No. 2,066,735, to Montgomery, sets forth a bridge for eyeglasses. The bridge forms a comfortable support on the nose of a wearer, so that the metal work of the frame of the eyeglasses will not come in contact with the nose or face of the wearer.

U.S. Pat. No. 3,701,592, to Fernandez, shows a vacuum spectacle bridge including structure on a pair of spectacles having a vacuum retaining means for holding the spectacles on the wearer's nose.

U.S. Pat. No. 3,758,202, to Chunga, Sr., describes eyeglass frames including adjustable lens support members for holding corrective or tinted eyeglass lenses adjacent the eyes of the wearer.

U.S. Pat. No. 4,304,470, to Marly, describes a spectacle frame with a pivotable auxiliary bridge. The curved auxiliary bridge is provided below a bridge rigidly joining rims of spectacle lenses. The auxiliary bridge is turnably mounted between the rims to freely adapt to a slope of a nose of a wearer.

U.S. Pat. No. 4,747,681, to Brower, illustrates a traction strip for eye wear. Each traction strip provides frictional engagement to the nose of a wearer.

U.S. Pat. No. 4,781,451, to McAllen, describes eye protectors such as spectacles, visors and the like to be releasably attached with three members having hook and loop fastening material. The fastening material secures the eye protector to a head band, hat, cap or other form of headgear.

U.S. Pat. No. 4,885,808, to Carpenter, shows a headband with multipositioned lens piece. The lens piece is removably attached to the headband. A spring member exerts a rotation-resisting force against a connecting member between lenses to prevent unwanted rotation of the lenses during use.

U.S. Pat. No. 4,964,716, to Combs, shows a removable cover for an eyeglass nose pad. The removable cover includes first and second members having releasably engagable portions formed of interlocking hook and pile. The first member is fixedly mounted on the nose pad with the releasably engaging portion facing outward from the nose pad. The second member is fixedly mounted to a soft, flexible sheet having a size approximate the size and shape of the nose pad.

All above examples of the prior art differ from the present invention in that none includes the magnetic features of the present invention. Also, the combination of components which are readily attached to glasses not originally designed to cooperate with elements for adhering to the bridge of the nose of the wearer is not seen in the prior art.

None of the above inventions and patents, taken either singly or in combination, is seen to describe the instant invention as claimed.

SUMMARY OF THE INVENTION

The present invention sets forth a device for securing the nose piece of eyeglasses to the face of a wearer. A significant problem solved by the invention is the propensity of eyeglasses that do not fit the wearer perfectly to slowly and progressively slide down the nose, so that the lenses are not in a correct orientation relative to the eyes. The device includes a first component adhered to the face of the wearer at the bridge of the nose, and a second component adhered to the frame of the eyeglasses. The two components are removably attached to one another when securing the eyeglasses in place.

The two components are compatible with any eyeglasses having a bridge piece spanning the two lenses or structure supporting the lenses. It is not necessary that the eyeglasses be designed to cooperate with the two components. Hence the invention can be retrofit to any conventional eyeglasses, goggles, visors, or other equipment covering the eyes and requiring full or partial support at the bridge of the nose of the wearer.

Each of the two components include adhesive tape bearing magnetically active material. One component is adhered to the bridge of the nose of the wearer and the other is adhered to the frame of the eyeglasses. The two components engage one another magnetically, thereby holding the eyeglasses in place at the bridge of the nose.

The two attaching components are sufficiently small as to be inconspicuous. That component adhered to the face is preferably flesh colored to be more effective in this regard. The two components are readily fabricated from stock materials, and can be formed economically in large quantities.

Accordingly, it is one object of the invention to provide a grip device for eyeglasses that secures eyeglasses to the bridge of the nose of the wearer.

Another object of the invention is to provide a grip device for eyeglasses utilizing inexpensive adhesive tapes that are coated or impregnated with magnetic material, wherein both components of the device utilize similar stock material.

A further object of the invention is to employ two separable attachment components, wherein one attachment component engages the face of the wearer and the other attachment component engages the eyeglasses.

An additional object of the invention is that the attachment components be inconspicuous, flexible, and of sufficient magnetic strength to be effective.

A further object of the invention is to provide a grip device for eyeglasses that is uncomplicated and easy to use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIGS. 4–7 are exploded top plan detail views showing alternative embodiments of structure of the attachment components of the invention.

DETAILED DESCRIPTION OF THE PREFERRED EMBODIMENTS

Figure 1:
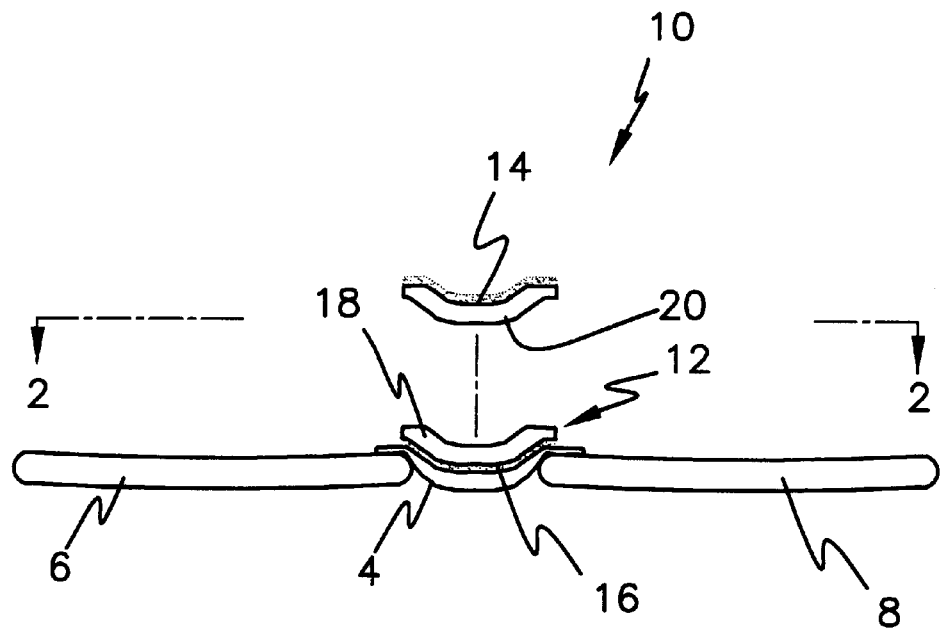
FIG. 1 is a diagrammatic top plan view of a pair of eyeglasses shown wherein one of the attachment components of the present invention is installed behind the bridge piece of the eyeglasses.

Turning now to the drawings, in which similar reference characters denote similar elements throughout the several views, FIG. 1 illustrates one of the two principal components of the present invention. The invention is a grip device 10 for eyeglasses 2 which overcomes the problem of eyeglasses 2 slowly sliding out of a preferred position (not shown) wherein the lenses are supported directly forwardly of the eyes of the wearer. Eyeglasses 2 are generally conventional, having a bridge piece 4 spanning and connecting right and left lenses 6, 8.

Figure 3:
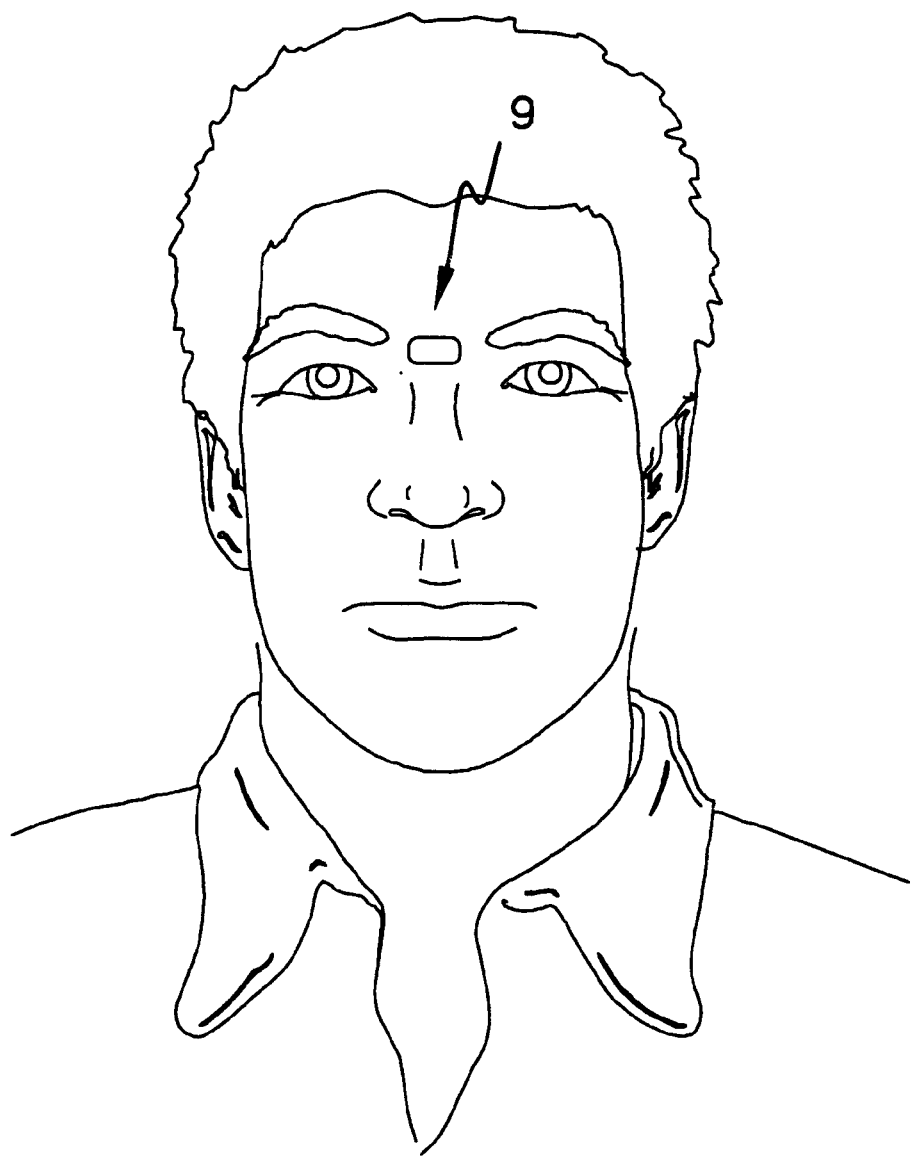
FIG. 3 is a front elevational view of a person's head shown with the second attachment component of the present invention installed on the bridge of the nose.

Grip device 10 comprises a first attachment component 12 for being attached to the eyeglasses and a second attachment component 14 for being attached to the face of a wearer at the bridge 9 of the nose (see FIG. 3). The two attachment components 12, 14 each have adhesive 16 disposed thereon. Attachment component 12 bears a first manually separable connector, such as magnet 18, and second attachment component 14 has a second manually separable connector matingly compatible with first manually separable connector. The separable connector of second attachment component 14 is, in the embodiment of FIG. 1, a second magnet or a ferrous material 20 which is magnetically responsive to magnet 18. The separable connectors of the embodiment of FIG. 1 comprise a magnetically active member and a complementing magnetically active member which attracts or is attracted to the first magnetically active member.

Figure 2:
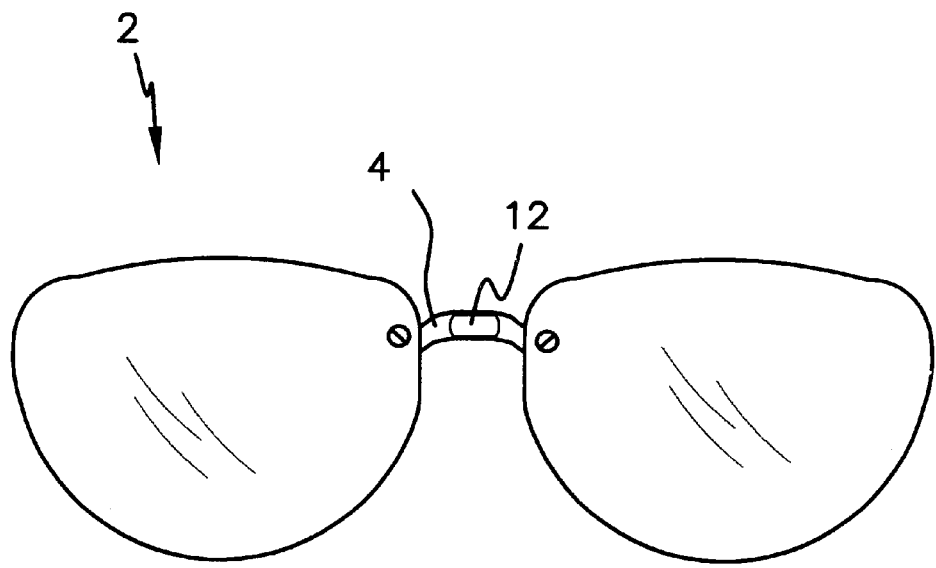
FIG. 2 is a rear elevational diagrammatic view of the pair of eyeglasses taken in the direction of arrow 2—2 in FIG. 1.

As seen in FIG. 2, it will be apparent that first attachment component 12 is dimensioned and configured to be inconspicuous, or not easily seen from the front, in its location as it is mounted on bridge piece 4 of the eyeglasses 2. As seen in FIG. 3, second attachment component 14 is also small, but not need be as small as component 12. Second attachment component 14 is flesh colored, in order to be inconspicuous when viewed against the face.

FIG. 4 shows the components of device 10 in greater scale than shown in FIG. 1. A second embodiment of the invention is shown in FIG. 5 wherein device 50 employs hook and loop material in the capacity of separable connectors. First attachment component 52 and second attachment component 54, which are analogous to components 12, 14 of FIG. 1, have adhesive 56 for respective attachment to bridge piece 4 and bridge 9 of the nose. Component 52 bears hook material 58. Component 54 bears complementing loop material 60 of the hook and loop fastening material.

It is preferable that component 14 comprise flexible tape, as shown in FIG. 6. Magnet 18 is adhered to the tape of component 12. For this purpose, the tape is a piece of double sided adhesive tape 22 having a first coating 16 of adhesive and a second coating 24 of adhesive. Component 12 is of similar construction, comprising a piece of double sided adhesive tape which enables its respective magnetically active member to adhere to bridge piece 4 of the eyeglasses 2.

The magnetically active members may take several forms. As seen in FIG. 6, tape of component 12 is coated with magnetic material in the form of magnet 18, with component 14 being similar. An alternative embodiment is shown in FIG. 7, wherein the base substrate 26 of tape 27 is impregnated with magnetic material. Adhesive layers 28, 30 coat substrate 26. Substrate 26 could be, for example, magnetically responsive foil.

It is to be understood that the present invention is not limited to the embodiments described above, but encompasses any and all embodiments within the scope of the following claims.

I claim:

1. A grip device for holding eyeglasses in position on the head of a wearer, comprising:

a) a single first attachment component having a first surface adapted for releasable, adhesive attachment to the forehead of a wearer of said eyeglasses and a second surface adapted for releasable connection to a second attachment component; and b) a single second attachment component having a first surface adapted for releasable, adhesive attachment to a central, bridge portion of said eyeglasses and a second surface adapted for releasable connection to said first attachment component;

whereby said eyeglasses are removably secured in a predetermined position on a wearer's head by interaction between said first and said second attachment components.

2. The grip device for holding eyeglasses in position on the head of a wearer as recited in claim 1, wherein said first attachment component and said second attachment component comprise magnetic material and said releasable connection of said first attachment component to said second attachment component is accomplished by magnetic attraction therebetween.

3. The grip device for holding eyeglasses in position on the head of a wearer as recited in claim 2, wherein said magnetic material comprises ferromagnetic material.

4. The grip device for holding eyeglasses in position on the head of a wearer as recited in claim 2, wherein said second attachment component is permanently affixed to said eyeglasses.

5. The grip device for holding eyeglasses in position on the head of a wearer as recited in claim 4, wherein said second attachment component is an integral part of said eyeglasses.

6. The grip device for holding eyeglasses in position on the head of a wearer as recited in claim 2, wherein at least one of said first and said second attachment components comprise flexible tape.

7. The grip device for holding eyeglasses in position on the head of a wearer as recited in claim 6, wherein said flexible tape comprises double-sided, adhesive tape.

8. The grip device for holding eyeglasses in position on the head of a wearer as recited in claim 1, wherein said first and said second attachment components comprise hook and loop fastening material adapted to facilitate a releasable connection therebetween.

9. The grip device for holding eyeglasses in position on the head of a wearer as recited in claim 8, wherein at least one of said first and said second attachment components comprise flexible tape.

10. The grip device for holding eyeglasses in position on the head of a wearer as recited in claim 9, wherein said flexible tape comprises double-sided, adhesive tape.

11. A method for releasably holding eyeglasses in position on the head of a wearer, comprising:
   a) providing a pair of eyeglasses having a central, bridge portion;
   b) attaching a single first attachment component to said eyeglasses proximate said central, bridge portion;
   c) attaching a single second attachment component at a preselected position proximate a central region on the forehead of a wearer of said eyeglasses;
   d) placing said eyeglasses in an operational position upon the head of said wearer and creating a releasable connection between said first attachment component and said second attachment component;

whereby said eyeglasses are removably secured in a predetermined position on a wearer's head by interaction between said first and said second attachment components.

12. The method for releasably holding eyeglasses in position on the head of a wearer as recited in claim 11, wherein said first attachment component and said second attachment component comprise magnetic material.

13. The method for releasably holding eyeglasses in position on the head of a wearer as recited in claim 12, wherein said first attachment component is permanently affixed to said eyeglasses.

14. The method for releasably holding eyeglasses in position on the head of a wearer as recited in claim 13, wherein said first attachment component is an integral part of said eyeglasses.

15. The method for releasably holding eyeglasses in position on the head of a wearer as recited in claim 12, wherein at least one of said first and said second attachment components comprise flexible tape.

16. The method for releasably holding eyeglasses in position on the head of a wearer as recited in claim 15, wherein said flexible tape comprises a double-sided, adhesive tape.

17. The method for releasably holding eyeglasses in position on the head of a wearer as recited in claim 11, wherein said first and said second attachment components comprise hook and loop fastening material adapted to facilitate a releasable connection therebetween.

\* \* \* \* \*